(12) United States Patent
Tansey

(10) Patent No.: US 7,560,515 B2
(45) Date of Patent: Jul. 14, 2009

(54) PVC ALLOY FOR USE IN AIR BAG DOORS

(75) Inventor: William J. Tansey, Lee, NH (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 345 days.

(21) Appl. No.: 11/278,121

(22) Filed: Mar. 30, 2006

(65) Prior Publication Data

US 2006/0252885 A1    Nov. 9, 2006

Related U.S. Application Data

(63) Continuation of application No. 10/363,771, filed as application No. PCT/US01/28262 on Sep. 10, 2001, now abandoned.

(60) Provisional application No. 60/231,099, filed on Sep. 8, 2000.

(51) Int. Cl.
  *C08L 27/04* (2006.01)
  *C08L 27/06* (2006.01)
  *C08L 23/00* (2006.01)
  *C08L 23/04* (2006.01)
  *C08L 23/06* (2006.01)

(52) U.S. Cl. .................. 525/191; 525/213; 525/239; 525/240

(58) Field of Classification Search .............. 525/191, 525/213, 239, 240
  See application file for complete search history.

(56) References Cited

U.S. PATENT DOCUMENTS

| | | |
|---|---|---|
| 3,006,889 A | 10/1961 | Frey et al. |
| 3,165,560 A | 1/1965 | Frey et al. |
| 3,209,055 A | 9/1965 | Hedburg et al. |
| 3,396,211 A | 8/1968 | Bonotto et al. |
| 3,467,732 A | 9/1969 | Schnebelen et al. |
| 3,856,891 A | 12/1974 | West et al. |
| 3,940,456 A | 2/1976 | Frey et al. |
| 4,054,615 A | 10/1977 | Hardt et al. |
| 4,113,805 A | 9/1978 | Frey et al. |
| 4,234,703 A | 11/1980 | Lindsay ............ 525/211 |
| 4,280,940 A | 7/1981 | Klug et al. |
| 4,513,108 A | 4/1985 | Jones ............... 524/180 |
| 4,556,694 A | 12/1985 | Wallace ............ 525/239 |
| 4,778,856 A | 10/1988 | Chen et al. ........ 525/190 |
| 5,086,122 A | 2/1992 | Lawson et al. .... 525/235 |
| 5,087,669 A | 2/1992 | Prejean ............ 525/239 |
| 5,270,381 A | 12/1993 | Yamanaka et al. ... 524/569 |
| 5,469,891 A | 11/1995 | Lund et al. ......... 138/98 |
| 5,525,284 A | 6/1996 | Grimmer .......... 264/301 |
| 5,532,055 A * | 7/1996 | Igarashi et al. ..... 428/318.6 |
| RE36,898 E * | 10/2000 | Sawada et al. ....... 428/43 |
| 6,140,420 A | 10/2000 | Sehanobish et al. ... 525/125 |

* cited by examiner

*Primary Examiner*—Nathan M Nutter
(74) *Attorney, Agent, or Firm*—Lyndanne M. Whalen; Noland J. Cheung

(57) ABSTRACT

A thermoplastic alloy of a melt processible crosslinked olefin thermoplastic elastomer dispersed in a PVC matrix. Improved compatibility of the alloyed components may be achieved through the use of a chlorinated olefin thermoplastic elastomer. The thermoplastic alloy is characterized by lessened mechanical deterioration from heat aging, and improved performance under low temperature conditions.

19 Claims, No Drawings

PVC ALLOY FOR USE IN AIR BAG DOORS

CROSS REFERENCE TO RELATED APPLICATIONS

This application is a continuation of U.S. application Ser. No. 10/363,771 filed Oct 14, 2003, which is the U.S. National Stage completion of International Application No. PCT/US01/28262 filed Sep. 10, 2001 (published as WO 02/20656 on Mar. 14, 2002) designating the U.S., and which claims the benefit of the filing data of U.S. Provisional Patent Application Ser. No. 60/231,099 filed Sep. 8, 2000, the teachings of which are incorporated herein by reference.

FIELD OF THE INVENTION

The present invention relates to a polyvinylchoride (PVC) blend/alloy that has particular use as an airbag door in a passenger vehicle. The blend/alloy comprises a mixture of PVC with a crosslinked, chlorinated olefin polymer system, with particularly good performance (low fragmentation) under low temperature deployment conditions.

BACKGROUND OF THE INVENTION

Present airbag/instrument panel coverstock technology uses PVC and/or PVC alloys for separate air bag doors and flip top instrument panel (IP) constructions. Recent airbag door design makes the door design integral to the coverstock. Upon deployment, the airbag breaks through the one piece IP coverstock. The coverstock materials and designs are therefore selected such that the deploying airbag pressure causes the coverstock to tear along a designed line.

When present technology PVC and PVC alloys are used on integral passenger side airbag doors, the deployed coverstocks tend to crack and fragment at cold temperatures. Coverstock fragmentation of the airbag door area creates airborne debris that can cause personal injury to the passenger. Original equipment manufacturers have therefore promulgated testing requirements to identify and control this issue with respect to passenger vehicle systems. For example, reference is made to Chryslers' PF-9007 performance standard specification which addresses low temperature deployment considerations.

The deployment criteria of no fragmentation during deployment is also critical on both new as well as "end of life" vehicles. Along such lines, it is noted that a heat-aging test may be used to predict and understand the performance of an aged instrument panel. For example, it has been found that PVC and/or PVC alloys will sacrifice more than 35% of their original physical properties when exposed to temperatures equal to and above 110° C. for periods of 500 hours or longer. The tendency for PVC to become brittle after this kind of heat exposure causes excessive loss of physical properties, resulting in fragmentation of the material when deployed at cold temperatures.

The prior art has attempted to deal with modifying and adjusting plasticized PVC material as it relates to the development of a PVC alloy/blend formulation with improved low temperature performance characteristics. Along such lines attention is first directed to U.S. Pat. No. 3,006,889. The '889 patent relates to polymers of vinyl chloride and chlorinated polymers of vinyl chloride blended with chlorinated polyolefins. The '889 patent recites that it should especially be noted that an addition of a relatively large amount of chlorination products practically does not impair the good properties of polyvinyl chloride, but improves considerably the resistance to cold of polyvinyl chloride. The '889 patent goes on to say that it is desirable to increase resistance to the cold to avoid brittleness.

Attention is next directed to U.S. Pat. No. 5,525,284. The '284 patent relates to a thermoplastic microsphere for use in roto-casting or slush molding shells. The '284 patent discloses polyvinyl chloride material including pure PVC and alloys with PVC in the form of microspheres having a diameter of 0.007" to 0.040" suitable for roto-casting or slush molding.

Finally, attention is directed to U.S. Pat. No. 5,086,122, which recites chlorinated polyvinylchloride resins, which are crosslinked, to provide improved processing properties such as reduced processing torques. In addition, the '122 patent discloses blends of CPVC with non-crosslinked CPVC.

Accordingly, as can be seen from the above review, there exists a need for a material, suitable for use as the skin layer in an air bag deployment door, that will provide improved performance at low temperature, and which will also withstand the test of time and continue to provide good low temperature performance over the life of the vehicle.

SUMMARY OF THE INVENTION

The present invention relates to a PVC alloy/blend comprising plasticized PVC and a melt processible thermoplastic elastomer. The thermoplastic elastomer comprises a crosslinked olefin based material, characterized in that the level of crosslinking does not preclude melt processing capability. The crosslinked olefin material may also be chlorinated, to improve its ability to blend and mix with plasticized PVC resin. The chlorinated crosslinked olefin polymer herein may comprise between 10-75% by weight of the blend formulation, as well as all 1% increments therebetween.

DETAILED DESCRIPTION OF THE INVENTION

As noted, the present invention relates to a PVC alloy/blend, comprising plasticized PVC and a crosslinked, melt processible thermoplastic elastomer. The preferred thermoplastic elastomer for use herein is a material sold under the tradename Alcryn®, which is manufactured and made available by Advanced Polymer Alloys. Alcryn® is described a thermoplastic elastomer, based upon a partially crosslinked chlorinated olefin interpolymer alloy, that processes like a thermoplastic material and which behaves as a rubber or elastomer (substantially amorphous and Tg below room temperature).

In addition, and as noted, the preferred crosslinked melt processible thermoplastic elastomer herein has the characteristic of partial crosslinking, up to that level that does not compromise melt processing capability, but which nonetheless provides properties similar to standard vulcanized rubber material. That being the case, the crosslinked melt processible thermoplastic elastomer herein, that is combined with the plasticized PVC, has the additional characteristics that it does not require vulcanization, can be injection molded, blow-molded, calendered, and vacuum formed, can be overmolded on a rigid substrate, molds in relatively short cycles, and produces scrap that can be recycled. In terms of mechanical property performance, the partially crosslinked elastomer herein that is blended with plasticized PVC is such that it provides a service temperature range itself of −40° C. to +107° C. In addition, the partially crosslinked elastomer herein is olefin based, and is chlorinated, such that the presence of the chlorination on the polyolefin increases and provokes a more favorable chemical interaction with the PVC, and therefore actual physical blending of the elastomer with the plasticized PVC polymer.

The tensile strength, tear strength, and elongation of the PVC alloy herein does not change more than ±35% from their original values after 500 hours of heat aging at 110° C. and therefore will still deploy without fragmenting at cold temperatures. As such the PVC alloy disclosed herein enables "integral" airbag instrument panel construction which panels pass deployments below −20° C., and down to −30° C. without fragmentation. Furthermore, the tensile strength, tear strength, and elongation of the PVC alloy herein does not change more than ±45% from their original values after 1000 hours of heat aging at 110° C.

As noted, the alloy material of plasticized PVC and a partially cross-linked, chlorinated olefin interpolymer alloy is preferably made from plasticized PVC and the material sold under the tradename Alcryn®. When evaluated using between a particularly preferred level of 10-25% by weight of the cross-linked chlorinated olefin interpolymer with the plasticized PVC material, optimum performance in an air bag application has been observed (fragmentation reduced to acceptable OEM testing requirements). In addition, the crosslinked chlorinated olefin interpolymer is preferably dispersed as discrete particles in the PVC matrix through melt compounding procedures such as extrusion, milling, or through the use of a Banbury mixer.

In addition, PVC alloys today generally cannot be used in the slush molding of invisible "integral" air bag doors unless the alloy is first cryogenically ground into a powder of irregularly shaped particles that have a size distribution in the range of 0.002" to 0.016". The alloy material herein, however, uniquely allows slush molding to be done using spherically fused particles with a size distribution between 0.007" and 0.040". Furthermore, the alloy material herein can be slush molded into automotive parts that meet OEM requirements, such as Ford specification WSB-M98D22-B and Chrysler specification MS-DC541.

In accordance with the invention herein, the following representative example provides guidance on the formulations that fall within the scope herein:

| | |
|---|---|
| PVC suspension resin | 100 grams |
| PVC dispersion resin | 7 grams |
| Linear Phthalate Plasticizer | 50-100 grams (preferred 75 grams) |
| Epoxidized Soybean Oil | 5-12 grams |
| Monomeric Adipate Plasticizer | 5-60 grams (preferred 20 grams) |
| Heat Stabilizers (Ba, Calcium, Phosphite, Zinc based) | 3-5 grams |
| Light Stabilizers | 0.5-1.5 grams |
| Calcium Cabonate | 2-20 grams |
| Thermoplastic Elastomer | 35-75 grams (preferred 38 grams) |

The preferred PVC suspension resin is Geon 471 from The Geon Company. The preferred PVC dispersion resin is Borden VC438 from Borden Chemical Company.

The preferred phthalate plasticizer is a linear phthalate plasticizer and is more preferably Jflex L11 from Exxon Chemical Company. Plasticizers which may be substituted for, or used in combination with, the linear phthalate plasticizer include, but are not limited to, branched phthalates and linear and branched trimillates. However, branched phthalates are less preferred when compared to linear phthalates due to volatile loss after heat aging. Trimillate plasticizers, whether branched or linear, have less volatile loss after heat aging than phthalate plasticizers which is generally desirable, but are still less preferred than linear phthalate plasticizers due to added cost.

The preferred adipate plasticizer is a monomeric adipate plasticizer. More preferably, the monomeric adipate plasticizer has an average molecular weight of 450-500. Such particularly preferred adipate plasticizer is therefore based upon an adipic acid ester, wherein the ester portion comprises a C4 to C10 alkyl chain.

With regards to the Alcryn® resin, the preferred Alcryn® resin is Alcryn 2160 NC, at a weight percent of about 15% in the poly(vinyl chloride) formulation. In connection with such alloy/blend, it was observed that the Alcryn initially demonstrated Tg values of −50.7 C, −11 C, +66 C and 112 C. However, once blended with the plasticized PVC resin as described in the above referenced Table, the observed Tg values were −66 C, +48 C and +100 C.

What is claimed is:

1. A method of forming an airbag door coverstock comprising:
   supplying a melt processible thermoplastic alloy, said alloy comprising a melt processible cross-linked olefin based thermoplastic elastomer dispersed as discrete particles in a matrix of plasticized poly (vinyl chloride), wherein said melt processible cross-linked olefin based thermoplastic elastomer is present at a level between 10 percent and 75 percent by weight of the alloy,
   slush molding said alloy to form said airbag door coverstock and wherein said airbag door coverstock does not fragment at a temperature of about −20° C.

2. The method of claim 1 wherein said cross-linked olefin based thermoplastic elastomer comprises a chlorinated olefin material.

3. The method of claim 2 wherein said chlorinated olefin material is present between about 10-25% by weight of the thermoplastic alloy.

4. The method of claim 1 wherein the tensile strength of said coverstock does not change by more than about +/−35% after 500 hours of heat aging at 110° C.

5. The method of claim 1 wherein the tear strength of said coverstock does not change by more than about +/−35% after 500 hours of heat aging at 110° C.

6. The method of claim 1 wherein the elongation of said coverstock does not change by more than about +/−35% after 500 hours of heat aging at 110° C.

7. The method of claim 1 wherein the tensile strength of said coverstock does not change by more than about +/−45% after 1000 hours of heat aging at 110° C.

8. The method of claim 1 wherein the tear strength of said coverstock does not change by more than about +/−45% after 1000 hours of heat aging at 110° C.

9. The method of claim 1 wherein the elongation of said coverstock does not change by more than about +/−45% after 1000 hours of heat aging at 110° C.

10. A method of forming an airbag door coverstock comprising:
    supplying a melt processible thermoplastic alloy, said alloy comprising a melt processible cross-linked olefin based thermoplastic elastomer dispersed as discrete particles in a matrix of plasticized poly (vinyl chloride), wherein said slush moldable alloy is present as spherically fused particles having a size distribution between 0.007 inches and 0.040 inches, wherein said melt processible cross-linked olefin based thermoplastic elastomer is present at a level between 10 percent and 75 percent by weight of the alloy, slush molding said alloy to form said airbag door coverstock, and wherein said airbag door coverstock does not fragment at a temperature of about −20° C.

11. The method of claim 10 wherein said cross-linked olefin based thermoplastic elastomer comprises a chlorinated olefin material.

12. The method of claim 10 wherein said chlorinated olefin material is present between about 10-25% by weight of the thermoplastic alloy.

13. The method of claim 10 wherein the tensile strength of said coverstock does not change by more than about +/−35% after 500 hours of heat aging at 110° C.

14. The method of claim 10 wherein the tear strength of said coverstock does not change by more than about +/−35% after 500 hours of heat aging at 110° C.

15. The method of claim 10 wherein the elongation of said coverstock does not change by more than about +/−35% after 500 hours of heat aging at 110° C.

16. The method of claim 10 wherein the tensile strength of said coverstock does not change by more than about +/−45% after 1000 hours of heat aging at 110° C.

17. The method of claim 10 wherein the tear strength of said coverstock does not change by more than about +/−45% after 1000 hours of heat aging at 110° C.

18. The method of claim 10 wherein the elongation of said coverstock does not change by more than about +/−45% after 1000 hours of heat aging at 110° C.

19. The method of claim 10 wherein said airbag door coverstock is integral to an instrument panel coverstock.

* * * * *